Jan. 7, 1936.  A. WOLLENSAK  2,026,723
BINOCULAR NOSE GLASS CONSTRUCTION
Filed Dec. 4, 1934
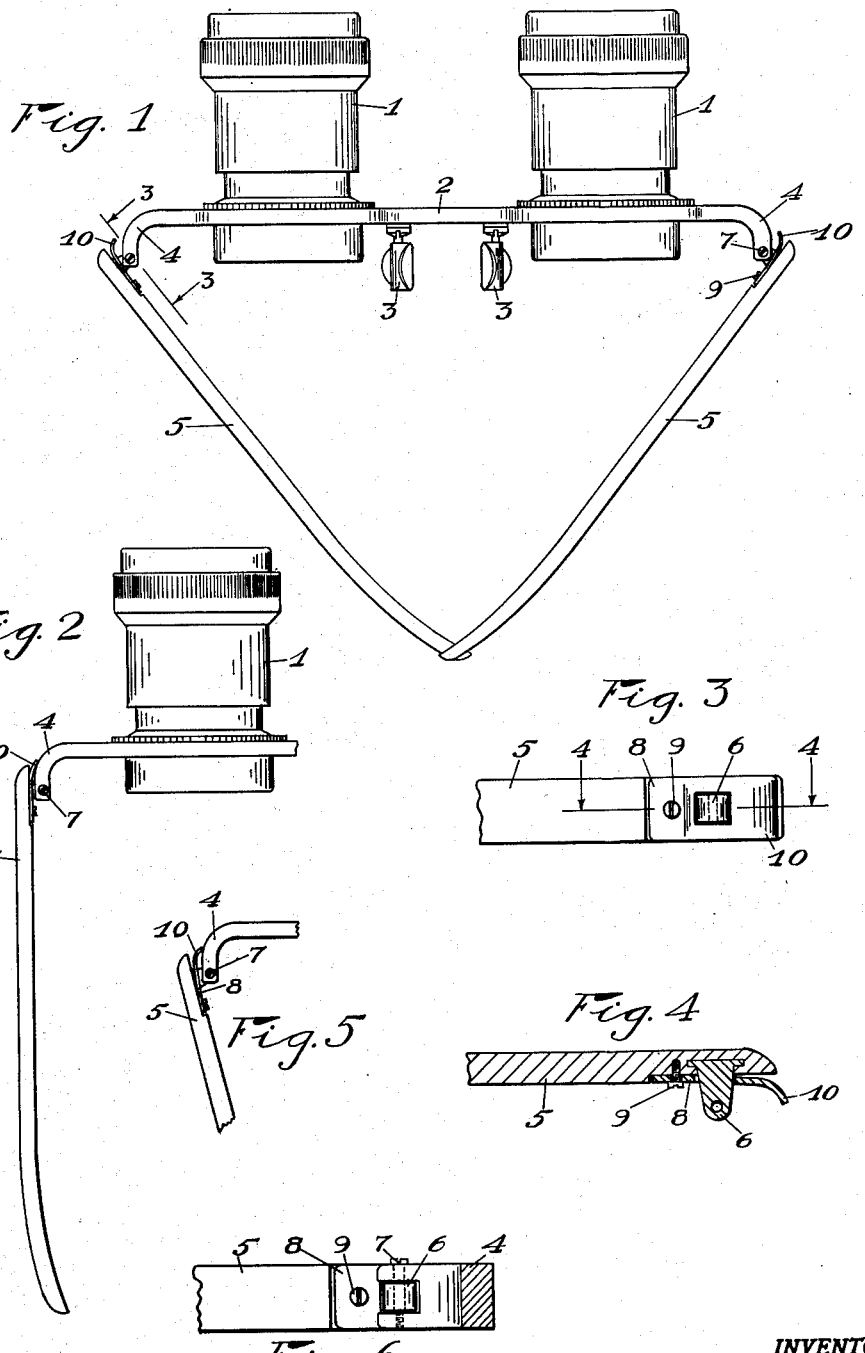
INVENTOR
Andrew Wollensak
ATTORNEY Patented Jan. 7, 1936

2,026,723

UNITED STATES PATENT OFFICE 2,026,723

BINOCULAR NOSE GLASS CONSTRUCTION

Andrew Wollensak, Rochester, N. Y., assignor to Wollensak Optical Company, Rochester, N. Y., a corporation of New York Application December 4, 1934, Serial No. 755,961

2 Claims. (Cl. 88—53)

This invention relates to a binocular nose glass construction, with more particular reference to the type of device in which a pair of lens barrels are carried on a frame of celluloid, zylonite, or the like, and has for its object to afford a structure whereby the temples adjust themselves readily to the head of the wearer and hold the glasses firmly in proper position without danger of bending the frame and thereby throwing the lenses out of proper alinement.

In field glasses or nose glasses of this general type, it not infrequently happens that the frame is bent at the bridge along a vertical axis when forcing the temples to fit the head of the wearer, and this results in throwing the lens barrels or lens systems out of their proper and parallel relationship, and the invention affords a simple, practical, and economical structure designed to overcome this defect.

To these and other ends, the invention consists in the construction and arrangement of parts that will appear clearly from the following description when read in conjunction with the accompanying drawing, the novel features being pointed out in the claims following the specification.

In the drawing:

Fig. 1 is a plan view of a pair of binocular nose glasses, showing the application of a preferred embodiment of the invention;

Fig. 2 is a similar view, with parts broken away, and illustrating a temple in its outermost position;

Fig. 3 is an enlarged elevational view of one end of the temple as seen on the line 3—3 of Fig. 1, looking in the direction indicated, and with the frame removed;

Fig. 4 is a sectional view on line 4—4 of Fig. 3;

Fig. 5 is a detail view showing the position of the parts when the spring first engages the frame, and Fig. 6 is a detail elevation.

Referring more particularly to the drawing, in which like reference characters refer to the same parts throughout the several views, 1 designates the lens barrels conveniently mounted on a frame which includes a central portion or bridge 2, adjacent to which the nose pads 3 are secured.

4 designates rearwardly curved end portions, on which the temples or bows are mounted. The temples or bows, designated at 5, are formed of zylonite, celluloid, or like materials, and each has embedded therein at its end a lug or hinge member 6 which is pivotally secured to the curved end 4 of the frame by a screw or pin 7.

Arranged between the curved end portion 4 of the frame and the temple is yieldable means, preferably a spring member, in the form of a leaf spring 8 having an opening therein through which the aforementioned lug 6 extends, the spring 8 being fixedly attached at one end to the temple 5 by the screw 9, or in any other convenient fashion to afford a yieldable free extremity for engagement with the frame to cushion the movement of the temple.

The spring 8 may be flexed slightly away from the temple, as shown in Fig. 4, and includes the curved extremity 10 which engages the outer surface of the curved end portion 4 of the frame as the temple is swung outwardly, the spring 8 flexing from the position shown in Fig. 1 to that shown in Fig. 2 as the temple is moved to its outermost position.

Consequently when the temple is in its extreme outermost position, the spring acts to move the temple toward the frame. This arrangement causes the temple to engage the head of the wearer with a yieldable pressure, holding the glasses firmly in position while permitting adjustment of the position of the temples anywhere between the extreme outermost position shown in Fig. 2 and an inner position occupied when the spring initially engages the frame. At any point between these two positions, the temples will engage the head and hold the glasses in proper position with sufficient firmness, and this arrangement permits the temples to be readily adjusted to heads of different size without the necessity or danger of bending the frame and thereby throwing the lens barrels out of their proper relationship to each other.

While the invention has been described with reference to a specific structure, it is not confined to the details herein disclosed, and this application is intended to cover such modifications or departures as may come within the intended purpose of the invention or the scope of the following claims.

I claim:

1. In a nose glass construction, the combination with a frame including a rearwardly curved end portion, of a temple carrying a lug pivoted to said end portion, and a leaf spring secured to the temple and having an opening embracing said lug, said spring having a curved extremity which engages said end of the frame as the temple is moved to its outermost position, the spring being then effective to tend to move the temple away from its extreme position.

2. In a nose glass construction, the combination with a frame including a rearwardly curved end portion, of a temple having a lug projecting from its inner face and pivoted at the extremity of said curved end portion of the frame, and a leaf spring arranged on the inner face of the temple and having an opening embracing said lug, one end of said spring being secured to the temple at one side of said lug and the other end of the spring being located on the other side of the lug and projecting away from the temple and toward said curved end portion of the frame which is engaged by the extremity of said spring as the temple is swung toward its outermost position.

ANDREW WOLLENSAK.